(12) United States Patent
Serratoni et al.

(10) Patent No.: US 6,803,768 B2
(45) Date of Patent: Oct. 12, 2004

(54) METHOD FOR GENERATING A FAULT SIGNAL IN A VOLTAGE REGULATOR AND CORRESPONDING CONTROL CIRCUITRY FOR A SYSTEM VOLTAGE REGULATOR

(75) Inventors: Claudio Serratoni, Milan (IT); Maurizio Gallinari, Pavia (IT); Giampietro Maggioni, Cornaredo (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 10/300,662

(22) Filed: Nov. 19, 2002

(65) Prior Publication Data
US 2003/0137307 A1 Jul. 24, 2003

(30) Foreign Application Priority Data
Nov. 28, 2001 (EP) .............................. 01830730

(51) Int. Cl.[7] ...................... G01R 31/02; G01R 31/327; G01R 31/00; G01R 31/08
(52) U.S. Cl. .......................... 324/521; 324/416; 324/503
(58) Field of Search ................................ 324/521, 416, 324/503

(56) References Cited

U.S. PATENT DOCUMENTS

| 5,252,926 A | 10/1993 | Menegoli ..................... 324/545 |
| 6,555,993 B2 * | 4/2003 | Taniguchi et al. ............ 322/28 |

FOREIGN PATENT DOCUMENTS

| EP | 0 430 208 A2 | 6/1991 |
| FR | 2 546 000 | 11/1984 |
| FR | 2 555 834 | 5/1985 |
| FR | 2 627 642 | 8/1989 |

* cited by examiner

*Primary Examiner*—N. Le
*Assistant Examiner*—John Teresinski
(74) *Attorney, Agent, or Firm*—Lisa K. Jorgenson; Robert Iannucci; Seed IP Law Group PLLC

(57) ABSTRACT

A method for generating a fault signal in a system voltage regulator by a phase signal includes detecting the system voltage and phase signal; comparing the system voltage and phase signal with respective fault levels; and generating a fault signal upon either the system voltage or the phase signal falling below the respective fault level of the fault levels. The fault signal generating method also inhibits generating a fault signal using a drive signal of the system voltage regulator. A diagnostic circuit for a system voltage regulator is also disclosed.

17 Claims, 4 Drawing Sheets

METHOD FOR GENERATING A FAULT SIGNAL IN A VOLTAGE REGULATOR AND CORRESPONDING CONTROL CIRCUITRY FOR A SYSTEM VOLTAGE REGULATOR

BACKGROUND OF THE INVENTION

1. Field of the Invention

The present invention relates to a method for generating a fault signal in a voltage regulator, and corresponding diagnostic circuitry for a system voltage regulator.

The invention also relates to diagnostic circuitry for a system voltage regulator, which circuitry implements the method according to the invention.

The invention relates, particularly but not exclusively, to a method for generating a fault signal in a voltage regulator of an automotive system voltage regulator, the description hereinafter covering this field of application for convenience of illustration only.

2. Description of the Related Art

As is well known, the automotive system voltage regulator 1 basically comprises an alternator 2, which is connected electrically to a battery 3 and to a voltage regulator 4, as shown schematically in FIG. 1.

The alternator 2 comprises a rotor 5, which is input mechanical torque and power from a car engine. The rotor 5 is commonly referred to as the "field".

The operation of the system voltage regulator 1 according to the prior art will be briefly reviewed here below.

The voltage regulator 4 detects a system voltage Aplus, and accordingly regulates a field current Iplus flowing through the rotor 5 of the alternator 2 to keep the system voltage Aplus at a constant value.

In particular, the voltage regulator 4 is input the system voltage Aplus, as well as a phase signal PH from the alternator 2, and has a first output terminal F connected to the rotor 5 and a second output terminal OUT provided to deliver a fault signal Fault.

As shown in FIG. 1, the rotor 5 has one end connected directly to the system voltage Aplus, which doubles as a supply voltage reference, and has the other end connected to the output terminal F of the voltage regulator 4 and connected, through the voltage regulator and a controlled switch 6, to another voltage reference which may be a ground reference GND.

It should be noted that the rotor 5 could be connected the other way around, i.e., with said one end connected to ground GND directly and said other end connected to the system voltage Aplus through a controlled switch. The regulator 1 operation would be the same.

To greatly simplify the system voltage regulator 1, it can be said that when the demand for current on the alternator 2 increases (e.g., as for a car system, due to a switching on of the car headlights), the field current Iplus flowing through the rotor 5 of the alternator 2 should increase to prevent the system voltage Aplus from falling. Consequently, the torque demand on the engine from the rotor 5 of the alternator 2 also increases.

If the field current Iplus increases rapidly, the demand for torque on the engine rises sharply and may cause the engine to shut down.

In last-generation system voltage regulators, the time constant by which the field current Iplus of the alternator 2 is made to vary changes with engine speed. More precisely, at low RPM, when least torque is output from the engine, the time constant is higher.

A widely used technique for regulating the system voltage Aplus and the field current Iplus in this manner is the pulse-width modulation (PWM) technique, wherein the current Iplus circulated through the rotor 5 is regulated by a fixed-frequency variable duty-cycle drive signal, designated DF in FIG. 1.

The switch 6 of the voltage regulator 4 is driven by the drive signal DF to regulate the current Iplus flowing in the rotor 5.

To properly regulate the system voltage Aplus, the up/down variations of the duty cycle of the drive signal DF are provided dependent on the engine speed.

In practice at low engine RPM, the drive signal DF may take a few seconds to go from 0% duty cycle to 100% duty cycle, so that the demand for torque on the engine will increase gradually, rather than sharply, giving the engine control unit plenty of time to respond and avoid an engine shutdown.

Another critical circumstance to the system in question is met at the engine start. To conform with applicable engine emission regulations, the engine control unit is to meter out the fuel such that a substantial number of variables, as read by respective sensors, are satisfied. The system voltage regulator also cumbers engine starting, because its demand of engine torque is unpredictable.

It is on this account that some last-generation system voltage regulators are designed to wait that the engine enters a steady condition, during the engine starting procedure, before the duty cycle value is increased. Accordingly, the voltage regulator 4 is disabled during the engine starting procedure, and the alternator 2 places no demand for torque on the engine while this is being started.

Once the engine starting procedure is completed, the voltage regulator 4 begins to regulate the system voltage after a time delay later referred to as the start-to-regulation delay.

Since an engine is apt to attain steady speed within a few hundreds of milliseconds, this is achieved by simply introducing a delay in the voltage regulator turning-on.

Also, the voltage regulator 4 controls the drive signal DF at a fairly low frequency, i.e., with a definitely low variation time constant of the current flowing through the rotor 5. This prevents, for instance, a cold engine still running at a low speed from being unintentionally shut down by a sudden demand for power. (For example, a still cold running engine of a car stopped at a traffic light is not put out by the headlights being flashed.)

The voltage regulator 4 of conventional voltage regulators 1 is provided with a diagnostic circuitry 7 adapted to process certain signals from the alternator 2, e.g., the phase signal PH and the supply voltage Aplus, and to generate the fault signal Fault when the alternator 2 is malfunctioning.

This diagnostic circuitry 7 comprises in particular, as shown schematically in FIG. 2, a first logic gate PL1, specifically an OR gate, which gate receives on a first input IN1 the system voltage Aplus and on a second input IN2 the phase signal PH, and has an output connected to a filter 8. The filter 8 is to supply the fault signal Fault to an output terminal OUT of the diagnostic circuitry 7. (The output terminal OUT is the second output terminal of the voltage regulator 4).

In the diagnostic circuitry 7, the system voltage Aplus is compared with the phase signal PH: if either signal falls below a given threshold voltage, the diagnostic circuitry 7 issues the fault signal Fault, optionally after a time delay enforced by the filter 8.

The delay enforced by the filter 8 is dependent on the time constant at which the current in the alternator rotor 5 is varied, and is usually of a few seconds in last-generation regulators. A filter 8 for automotive use comprises basically a large plurality of flip-flops FF and, accordingly, its fabrication requires large silicon area.

In particular, in the system voltage regulator 1, the voltage regulator 4 exits its standby condition and the fault signal Fault becomes active the moment the engine is started.

The fault signal Fault becomes inactive after the phase voltage PH and system voltage Aplus attain their set values. This event used to take very little time, a few hundred milliseconds, in the old regulators where the rise in rotor current went uncontrolled and the fault signal Fault only stayed active when a failure actually occurred. In last-generation regulators, this same event takes a longer time, so that the signal Fault will stay active longer. In particular, with the engine started and running normally, the signal Fault may stay active for a few more seconds before being disabled.

The following is the visual situation when a car engine in good order and using the diagnostic circuitry 7 shown in FIG. 2 is started:

the engine starts normally within a few hundred milliseconds; and a fault light (driven by the fault signal Fault) stays on for a few seconds and then goes off.

To obviate this problem, last-generation voltage regulators are equipped with more complicated diagnostic circuits. An example is shown schematically in FIG. 3 and generally designated 7A.

The diagnostic circuitry 7A comprises, adjunctive to diagnostic circuit 7, a second logic gate PL2, specifically a NAND gate, having a first input terminal A2 connected to the output terminal of the first logic gate PL1 and having an output terminal connected to the input of the filter 8. It further comprises a third logic gate PL3, having a first input terminal A3 connected to the output of the filter 8 and having an output terminal OUT arranged to issue the fault signal Fault.

The second logic gate PL2 has a second input terminal B2 connected to a third input terminal IN3 of the diagnostic circuitry 7A through an additional filter 9. The third logic gate PL3 has a second input terminal B3 connected directly to said third input terminal IN3, whereon a trigger signal RotON is present.

In particular, the trigger signal RotON would be active when the engine is started (ON) to turn off the fault signal Fault through the third logic gate PL3, and delay triggering on the diagnostic circuitry 7A.

With the engine shut down (OFF), the trigger signal RotON, indicating the engine state as previously explained, is at a logic low (RotON=0) and goes high (RotON=1) as the engine begins to turn.

In the diagnostic circuitry 7A shown in FIG. 3, the trigger signal RotON temporarily disables the fault signal Fault as the engine starts running, and then re-enables it after the filtering time across the filters 8 and 9 has elapsed.

In this way, if the system is working as expected, the fault signal Fault from the diagnostic circuitry 7A is disabled as soon as the engine begins running.

In the event of a failure occurring, the fault signal Fault, after being disabled, is enabled to warn of a fault.

In particular, with the engine stopped, the trigger signal RotON is at a logic low (RotON=0) and the phase signal PH and system voltage Aplus are at a logic high, or in a fault state (PH=1 and Aplus=1), where PH and Aplus are the phase and voltage fault logic signals.

In this case, the third logic gate PL3 has its first input terminal A3 at a logic high (A3=1) and its second input terminal B3 at a logic low (B3=0), and outputs a high logic value (Fault=1) to warn of a fault situation.

As the engine begins to run, the trigger signal RotON goes high (RotON=1), disabling the fault signal Fault (Fault=0) as explained hereinafter.

When the trigger signal RotON goes high (RotON=1), the output of the additional filter 9 also goes high, usually after the filtering time of the additional filter 9 has elapsed.

In particular, the filtering time of the additional filter 9 equals the start-to-regulation delay mentioned above. If the regulator has not this function, filtering time is nil.

After this start-to-regulation delay has elapsed, a logic high (B2=1) appears on the second input terminal B2 of the second logic gate PL2. The second logic gate PL2 outputs the negation of the signal on the first input terminal A2.

In a fault state, the signal on the first input terminal A2 would go high (A2=1), so that the output of the second logic gate PL2 goes low from a high logic level. As the filter 8 is input a change of state, from high to low, it starts filtering.

The filter 8 is sized to have a filtering time equal to the time as the drive signal DF goes from 0% duty cycle to 100% duty cycle.

After the filtering time of filter 8 has elapsed, the filter output goes low (A3=0) from high. Since the other input of the third logic gate PL3 is at a logic high (B3=1), PL3 output (Fault) will be high, i.e., in a fault state.

To summarize, as the engine starts running, the trigger signal RotON goes from a low (RotON=0) to a high (RotON=1) logic value, and the signal Fault goes from a high logic value (B2=1), i.e., a fault state, to a low logic value (B2=0), and this lasts until expiration of the filtering time of the filter 8, equal to the start-to-regulation delay, if provided, and of the filtering time of the filter 8, equal to the time as the drive signal DF goes from 0% to 100% duty cycle.

Thereafter, if the fault state continues, the fault signal Fault on the output terminal OUT of the diagnostic circuit changes its state to a logic high (Fault=1), otherwise stays low (Fault=0).

Due to the high time constant of the system response, even when the engine has been running for some time and the voltage regulator 4 is performing its function as expected, if a substantial load is connected or disconnected, the performance of the new-generation regulator will differ from that of prior regulators.

In particular, when a substantial load is connected across the alternator 2, the regulated system voltage Aplus falls and the field current Iplus slowly begins to rise, but a few seconds may intervene before the voltage is restored to the right value.

During this time interval, since the system voltage Aplus is below the fault threshold, a signal having a high logic level is generated on the output of the first logic gate PL1 of the diagnostic circuitry 7, 7A. Once again, for the signal Fault to be enabled only on the occurrence of an actual failure, the output from the first logic gate PL1 is to be filtered through the filter 8 for a time period equal to that as the drive signal DF goes from 0% to 100% duty cycle.

Another situation of the system performing properly but possibly undesirably enabling the signal Fault because the rotor field current changes slowly, occurs as an electric load is disconnected from the system Aplus line. To illustrate how the signals evolve under the condition of FIG. 4, waveforms have been plotted for the signals pertaining to the system voltage AIus, a phase voltage $V_{PH}$ with a corresponding fault threshold Sfault, the phase signal PH, and the drive signal DF.

With reference to the plots of FIG. 4, the following is noticeable in particular.

Time $t_1$

A load is disconnected from the regulator 1. The system voltage Aplus rises above a regulated value REG that is to be maintained. The windings of the rotor 5 in the alternator 2 are disconnected from the power supply circuit by the drive signal DF, and the field current Iplus flowing through them falls down at the alternator time constant rate; consequently, the phase voltage $V_{PH}$ will also fall.

Time $t_2$

The phase voltage $V_{PH}$ falls below the fault threshold Sfault, and enables the phase signal PH.

Time $t_3$

Upon the system voltage Aplus falling below the regulated value REG, the voltage regulator 4 begins to increase the duty-cycle value of the drive signal DF from a near 0% value, and the phase voltage $V_{PH}$ begins to rise.

Time $t_4$

The phase voltage $V_{PH}$ rises above the fault threshold Sfault, and disables the phase signal PH.

Time $t_5$

The system voltage Aplus is restored to its correct value REG.

From the evolution of the signals plotted in FIG. 4, it can be seen that the phase voltage $V_{PH}$ stays below the fault threshold Sfault throughout the period $t_4$–$t_2$ (when the phase signal PH stays active). Here again, the output of the first logic gate PL1 of the diagnostic circuitry 7, 7A goes from low (A2=0) to high (A2=1) and stays there throughout the period $t_4$–$t_2$.

This time period $t_4$–$t_2$ is dependent on the rate of increase of the duty cycle of the drive signal DF, and can be controlled by adjusting this rate.

For the regulator 1 to perform as expected, the filter 8 is to filter the signal that is going through the diagnostic circuitry for a few seconds time. In particular, the filtering time should be longer than the time as the fixed frequency drive signal DF goes from 0% to 100% duty cycle, i.e., the filtering time should amount to a few seconds.

In other words, detecting a failure with a conventional arrangement for regulating a car system voltage Aplus involves filtering the fault signal Fault for a few seconds. A diagnostic time delay of this magnitude reflects adversely on area requirements for the voltage regulator 4.

BRIEF SUMMARY OF THE INVENTION

The underlying technical problem of this invention is to provide a method for generating a fault signal by diagnostic circuitry in a system voltage regulator, in particular a car system voltage regulator, and corresponding diagnostic circuitry, with structural and functional features appropriate to overcome the limitations of conventional regulators.

In particular, an object of this invention is to provide a method for generating a fault signal by a diagnostic circuitry in a system voltage regulator, which method would involve no long filtering times and thus obviate the aforementioned problems, and corresponding diagnostic circuitry and voltage regulator.

An embodiment of this invention provides a method for generating a fault signal, using the fixed-frequency drive signal as a control signal to generate the fault signal at low system voltage and phase voltage values.

In particular, before the drive signal attains 100% duty cycle, the fault signal is disabled, so that the diagnostic circuitry will only output a fault signal when a real problem arises. Thus, there is no need to filter the internal signals of the diagnostic circuitry, and savings in silicon area for the corresponding regulator of the voltage regulator are provided.

An embodiment of the invention is directed to a method for generating a fault signal in a system voltage regulator by means of a phase signal, which method comprises the steps of:

detecting the system voltage and said phase signal;

comparing said system voltage and said phase signal with respective fault levels;

generating a fault signal upon either said system voltage or said phase signal falling below the respective level of said fault levels; and inhibiting said step of generating a fault signal by means of a drive signal of said system voltage regulator.

The features and advantages of the method for generating a fault signal, and of the diagnostic circuitry for a system voltage regulator according to the invention should become apparent from the following description of an embodiment thereof, given by way of non-limitative example with reference to the accompanying drawings.

DETAILED DESCRIPTION OF THE INVENTION

Figure 5:
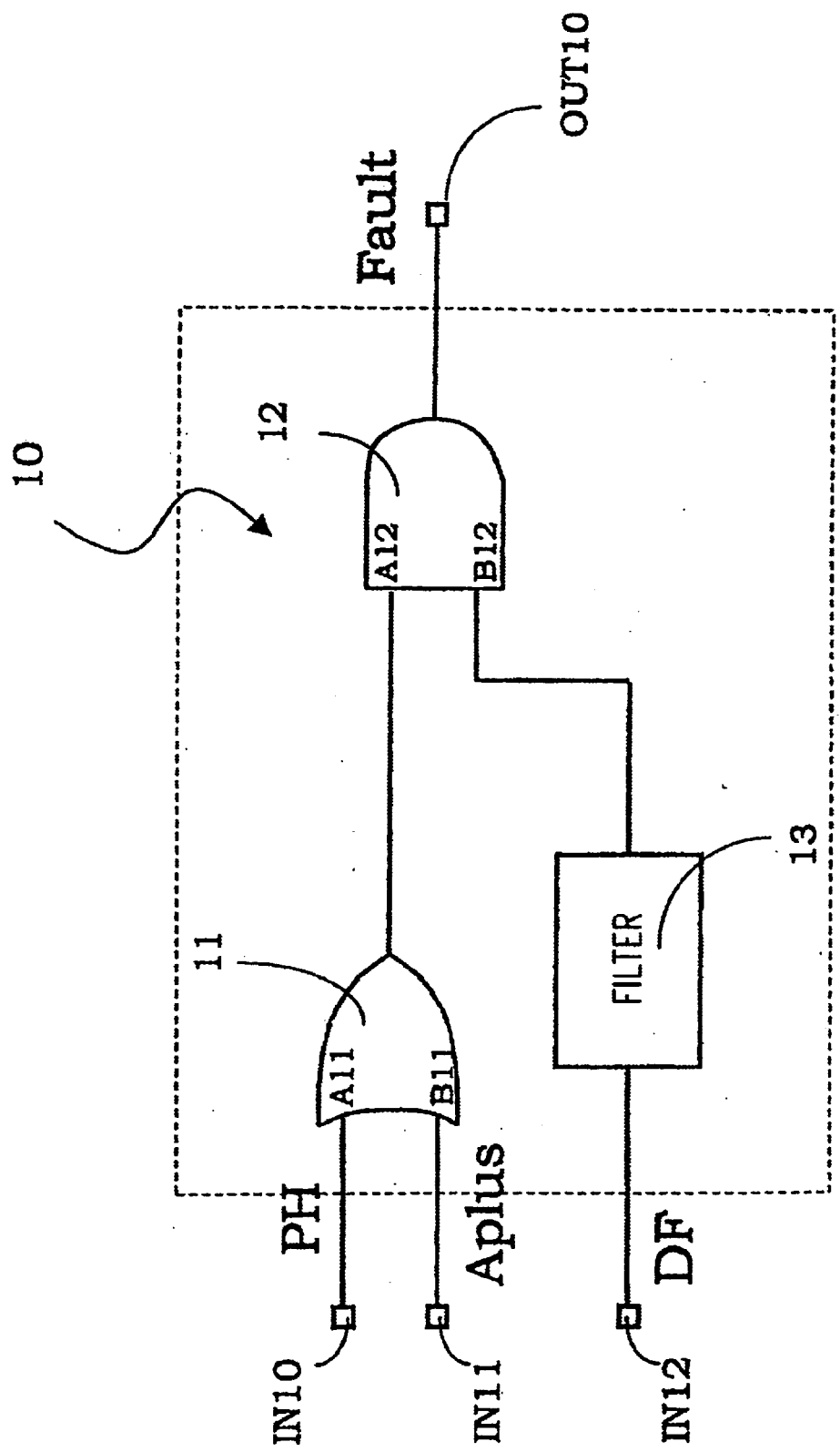
FIG. 5 shows schematically a diagnostic circuitry for a system voltage regulator according to the invention.

With reference to the drawings, in particular to FIG. 5 thereof, a diagnostic circuitry 10 for a system voltage regulator according to the invention is generally shown in schematic form.

Figure 1:
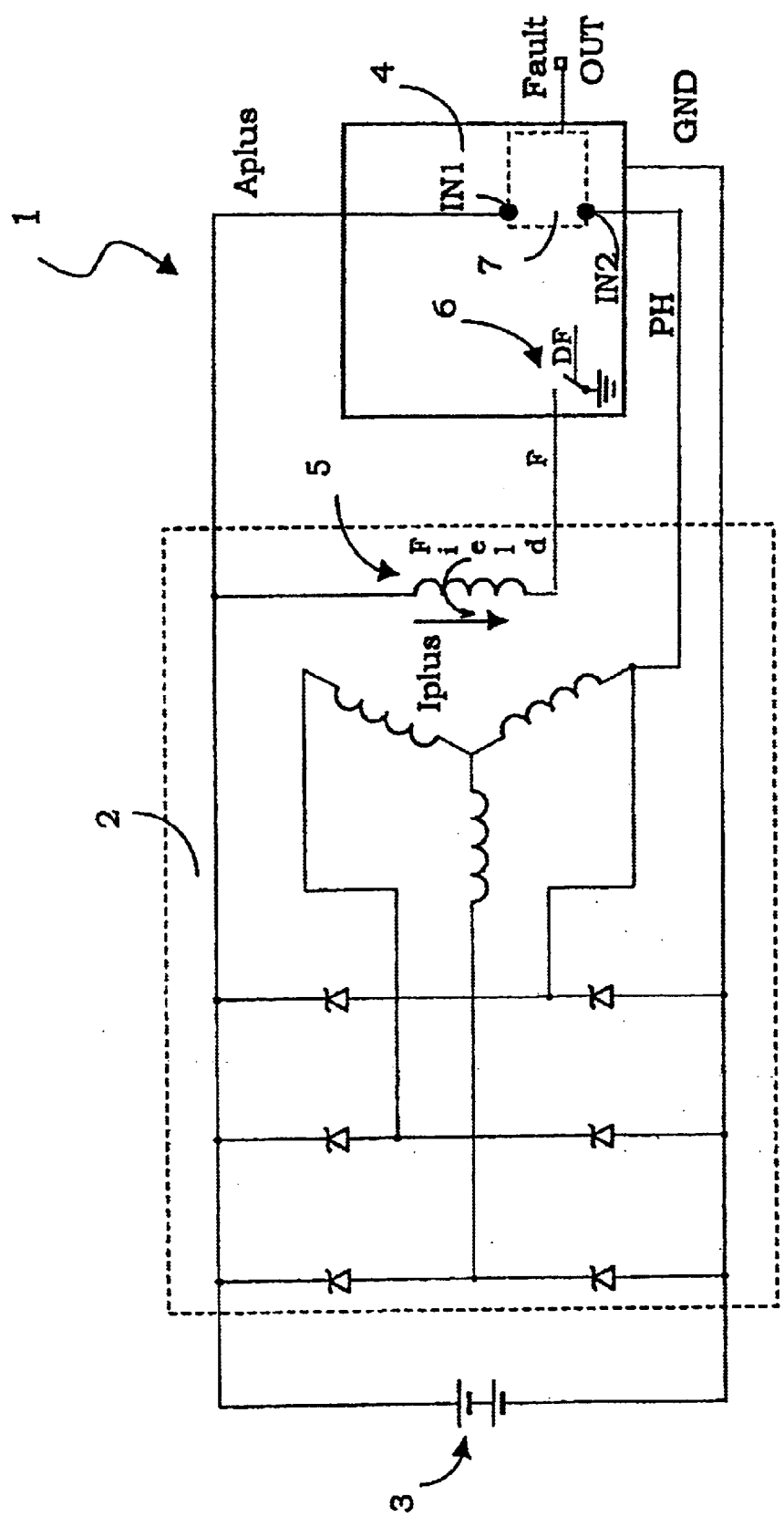
FIG. 1 shows schematically a car system voltage regulator according to the prior art.
Figure 2:
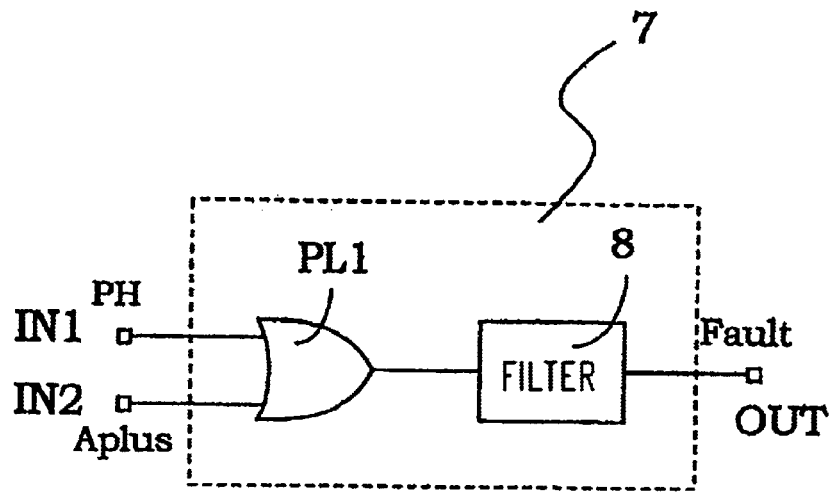
FIGS. 2 and 3 show schematically diagnostic circuitries incorporated in the regulator of FIG. 1.
Figure 3:
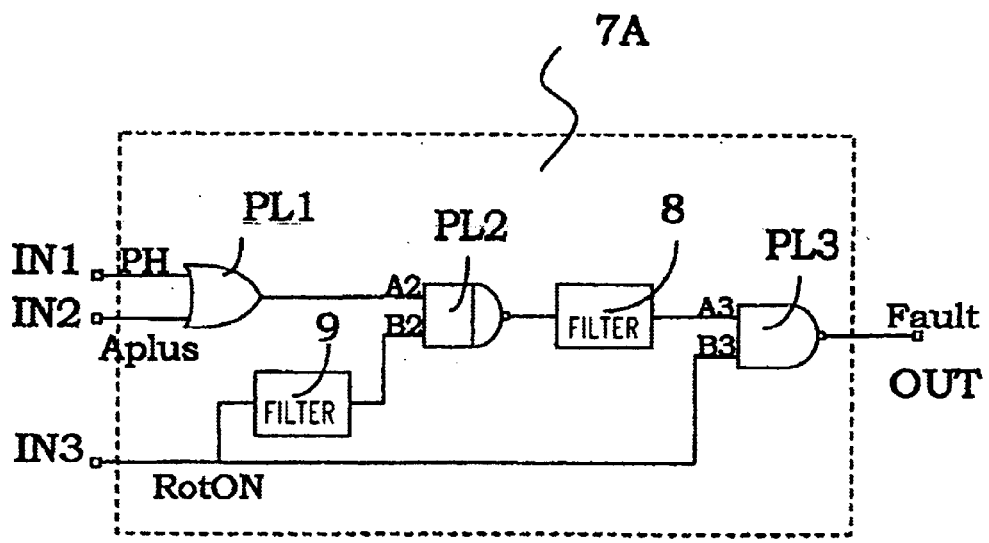
Figure 4:
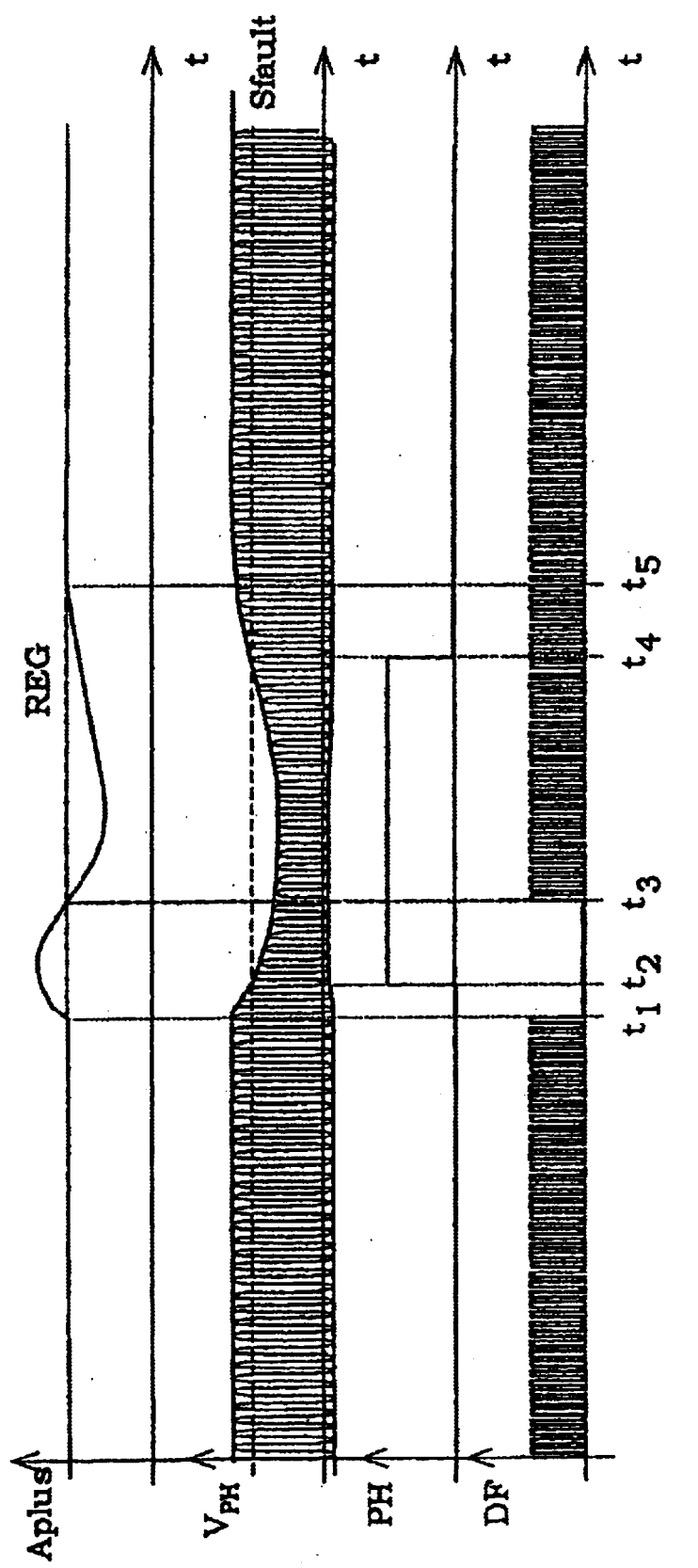
FIG. 4 shows schematically internal signals of the regulator of FIG. 1 plotted against time.

The present invention relates to a car system voltage regulator useful comprising essentially an alternator that is connected electrically to a battery and a voltage regulator, as shown in FIG. 1 illustrating the prior art solution.

Structurally and functional identical elements with those of the conventional arrangement described hereinabove are denoted by the same references and no further described.

In particular, the diagnostic circuitry 10 implements a method of generating a fault signal according to the invention, and makes use of the fixed-frequency drive signal DF with variable duty cycle to disable the fault signal Fault output from the circuit 10.

As explained in connection with prior circuits, the drive signal DF regulates the current flowing through the rotor 5 of the car-mounted alternator 2 using the conventional PWM technique.

It should be noted that, during said turn-on step, the generation of the fault signal Fault is no indication of any actual failure.

Based on these considerations, a method for generating a fault signal by a diagnostic circuitry in a system voltage regulator according to an embodiment of the invention comprises the following steps:

detecting the system voltage Aplus and the phase voltage $V_{PH}$, and comparing them with respective fault levels REG and Sfault; and inhibiting generation of a fault signal Fault at turning on the system voltage regulator or on particular phases of the system voltage regulating operation (electric load connected/disconnected).

In particular, the generation of the fault signal is disabled by the drive signal DF. The fault signal Fault is only enabled as the duty cycle of the signal DF attains 100%.

The fault signal Fault concerning the system voltage Aplus and the phase signal PH is, therefore, disabled by the drive signal DF at low values of those signals, and the diagnostic circuitry 10 will only correctly output the fault signal Fault on the occurrence of an actual failure.

Also, the method advantageously requires no filtering of the fault signal Fault within the diagnostic circuitry 10.

A possible embodiment of the diagnostic circuit 10, implementing the fault signal generating method just described, is shown in FIG. 5 by way of non-limitative example.

The diagnostic circuitry 10 has a first input terminal IN10 arranged to receive the phase signal PH, a second input terminal IN11 arranged to receive the system voltage Aplus, and an output terminal OUT10 delivering the fault signal Fault.

The diagnostic circuitry 10 also has a third input terminal IN12 arranged to receive the drive signal DF.

In particular, the diagnostic circuit 10 comprises a first logic gate 11 of the OR type, which gate has input terminals A11, B11 connected to the first and second input terminals IN10, IN11, respectively, of the diagnostic circuitry 10, and has an output terminal connected to a first input terminal A12 of a second logic gate 12 of the AND type.

The second logic gate 12 has a second input terminal B12 connected, through a filter 13, to the third input terminal IN12 of the diagnostic circuitry 10, and has an output terminal connected to the output terminal OUT10 of the diagnostic circuitry 10.

Advantageously, the drive signal DF disables, through the filter 13 and the second logic gate 12, generating the fault signal Fault on the output terminal OUT10 of the diagnostic circuitry 10 at duty cycle values below 100%. It is only upon the drive signal DF attaining 100% duty cycle that the second logic gate 12 will enable the diagnostic circuitry 10 to generate the fault signal Fault.

It should be noted in particular that the drive signal DF is a fixed-frequency logic signal effective to open/close the supply circuit to the rotor 5 of the alternator 2 of the system voltage regulator 1.

Advantageously, the drive signal DF is passed into a filter 13 whose filtering time is longer than the signal period. Thus, if the drive signal DF changes it state or is in a low state, the filter 13 would output a low logic value.

In this case, since a low logic value or logic 0 is present on the second input terminal B12 of the second logic gate 12, the gate output terminal would be at a low logic level. This low logic level of the fault signal Fault indicates that the arrangement is operating properly (Fault=0).

As the drive signal DF attains 100% duty cycle, i.e., when maximum current flows through the rotor 5 of the alternator 2, a high logic level or logic 1 will be output from the filter 13. Thus, the signal present on the first input terminal A12 of the second logic gate 12 is replicated to its output terminal.

In the event of a fault of low values of the phase signal PH and the system voltage Aplus, a high logic value would appear on the output terminal of the first logic gate 11; consequently, the fault signal Fault (Fault=1) has a high logic value due to the high logic value on the output terminal of the second logic gate 12.

Thus, the diagnostic circuitry 10 correctly detects the occurrence of a failure in a system voltage regulator, even when the values of the signals PH and Aplus are low (an undervoltage condition).

The diagnostic circuitry 10 is also advantageous from the standpoint of occupation of silicon area.

The filter 13 in the diagnostic circuit 10 has a filtering time which is three orders of magnitude shorter than in the prior art, and accordingly, can be manufactured using a smaller silicon area, indeed.

In particular, it should be noted that the filter 13 is not to filter the fault signal Fault within the diagnostic circuitry 10. In particular, the time constant of the filter 13 varies from a few seconds to a few milliseconds, i.e., the same order of magnitude as the period of the drive signal DF, which reflects on a substantial saving of silicon area when the regulator that includes the diagnostic circuitry 10 is to be manufactured.

All of the above U.S. patents, U.S. patent application publications, U.S. patent applications, foreign patents, foreign patent applications and non-patent publications referred to in this specification and/or listed in the Application Data Sheetare incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method for generating a fault signal in a system voltage regulator by a phase signal, the method comprising the steps of:

detecting said system voltage and phase signal;

comparing said system voltage and phase signal with respective fault levels;

generating a fault signal upon either said system voltage or said phase signal falling below the respective fault level of said fault levels;

detecting whether a duty cycle of a drive signal of said system voltage regulator has attained 100%; and inhibiting said step of generating a fault signal in response to detecting that the duty cycle of the drive signal has not attained 100%.

2. The method for generating a fault signal according to claim 1, wherein said generating step generates said fault signal in response to detecting that duty cycle of said drive signal has reached 100%.

3. A diagnostic circuit of a system voltage regulator for a voltage regulator, the circuitry comprising:

a first input terminal receiving a phase signal effective to regulate said system voltage;

a second input terminal receiving said system voltage;

an output terminal connected to the input terminals and structured to deliver a fault signal to said regulator;

a first logic gate having first and second input terminals connected to said first and second input terminals, respectively, of said diagnostic circuitry;

a third input terminal receiving a drive signal effective to disable said fault signal; and a filter connected between said third input terminal and output terminal of said diagnostic circuit.

4. The diagnostic circuit according to claim 3, further comprising a second logic gate having a first input terminal connected to said output terminal of said first logic gate, a second input terminal connected to said filter, and an output terminal connected to said output terminal of said diagnostic circuitry.

5. The diagnostic circuit according to claim 4, wherein said second logic gate is an AND gate.

6. The diagnostic circuit according to claim 3, wherein a time constant of said filter is comparable to a period of said drive signal.

7. The diagnostic circuit according to claim 3, wherein said first logic gate is an OR gate.

8. The diagnostic circuit according to claim 3 wherein the drive signal is a pulse-width modulated signal that is used by the system voltage regulator to regulate the system voltage.

9. A voltage regulator, comprising:
   a first input terminal receiving a phase signal effective to regulate the system voltage;
   a second input terminal receiving the system voltage;
   a regulator node effective to regulate the system voltage;
   a fault terminal connected to the input terminals and structured to deliver a fault signal;
   a diagnostic circuit having a first input connected to the first input terminal, a second input connected to the second input terminal, an output connected to the fault terminal, and a third input that receives a drive signal effective to disable the fault signal, the drive signal also being effective to regulate the system voltage via the regulator node; and
   a drive switch having a control terminal coupled to the drive signal, a first conduction terminal coupled to the regulator node, and a second conduction terminal coupled to a voltage reference.

10. The voltage regulator of claim 9 wherein the diagnostic circuit includes a logic gate having a first input connected to the first input terminal, a second input connected to the second input terminal, and an output connected to the fault terminal.

11. The voltage regulator of claim 9 wherein the drive signal is a pulse-width modulated signal that is used by the drive switch to regulate the system voltage.

12. The voltage regulator of claim 9 further comprising a vehicle alternator having a field coil with a first terminal connected to the system voltage and a second terminal connected to the regulator node, the drive signal regulating the system voltage by varying a current through the field coil.

13. A voltage regulator, comprising:
   a first input terminal receiving a phase signal effective to regulate the system voltage;
   a second input terminal receiving the system voltage;
   a regulator node effective to regulate the system voltage;
   a fault terminal connected to the input terminals and structured to deliver a fault signal; and
   a diagnostic circuit having a first input connected to the first input terminal, a second input connected to the second input terminal, an output connected to the fault terminal, and a third input that receives a drive signal effective to disable the fault signal, the drive signal also being effective to regulate the system voltage via the regulator node, wherein the diagnostic circuit includes a filter connected between the third input and the output of the diagnostic circuit.

14. The voltage regulator of claim 13, wherein the diagnostic circuit includes:
   a first logic gate having a first input connected to the first input terminal, a second input connected to the second input terminal, and an output; and
   a second logic gate having a first input connected to the output of the first logic gate, a second input connected to the filter, and an output connected to the fault terminal.

15. The voltage regulator of claim 14 wherein the first logic gate is an OR gate.

16. The voltage regulator of claim 14 wherein the second logic gate is an AND gate.

17. The voltage regulator of claim 13 wherein a time constant of the filter is comparable to a period of the drive signal.

* * * * *